(12) United States Patent
Tomita et al.

(10) Patent No.: US 10,843,643 B2
(45) Date of Patent: Nov. 24, 2020

(54) INSERTION COUPLING STRUCTURE, ELECTRICAL CONNECTION BOX, AND WIRE HARNESS

(71) Applicant: Yazaki Corporation, Tokyo (JP)

(72) Inventors: Kei Tomita, Shizuoka (JP); Daiki Yamamoto, Shizuoka (JP); Suguru Sakai, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/671,161

(22) Filed: Oct. 31, 2019

(65) Prior Publication Data

US 2020/0172030 A1    Jun. 4, 2020

(30) Foreign Application Priority Data

Nov. 29, 2018  (JP) ................. 2018-223177

(51) Int. Cl.
  *B60R 16/023* (2006.01)
  *H02G 3/32* (2006.01)
  *H02G 3/08* (2006.01)
  *F16B 2/10* (2006.01)

(52) U.S. Cl.
  CPC .......... *B60R 16/0239* (2013.01); *F16B 2/10* (2013.01); *H02G 3/081* (2013.01); *H02G 3/32* (2013.01)

(58) Field of Classification Search
  CPC ....... B60R 16/0239; F16B 2/10; H02G 3/081; H02G 3/32; H01R 12/716; H05K 5/0026

USPC ....................................... 439/76.2
  See application file for complete search history.

(56) References Cited

U.S. PATENT DOCUMENTS

| 7,671,275 | B2 * | 3/2010 | Kubota | ............ H01R 13/5227 174/50 |
| 8,941,009 | B2 * | 1/2015 | Makino | .................. B60R 16/02 174/50 |
| 9,066,423 | B2 * | 6/2015 | Makino | ............... H05K 5/0239 |
| 9,142,944 | B2 * | 9/2015 | Makino | .................. H02G 3/088 |
| 10,131,297 | B1 * | 11/2018 | Kakimi | ............. B60R 16/0238 |

FOREIGN PATENT DOCUMENTS

| JP | 8-222328 A | 8/1996 |
| JP | 11-339893 A | 12/1999 |
| JP | 2000-30812 A | 1/2000 |
| JP | 2008-286327 A | 11/2008 |

* cited by examiner

*Primary Examiner* — Hien D Vu
(74) *Attorney, Agent, or Firm* — Kenealy Vaidya LLP

(57) ABSTRACT

An insertion coupling structure includes a base portion that is in contact with a surface on one side in a thickness direction of a coupling member, a clamping portion that faces a surface on the other side of the coupling member, a rigid supporting portion that is provided to the clamping portion in a rib-like shape along an insertion direction that intersects the thickness direction of the coupling member and in which the coupling member is inserted, and is in contact with the surface on the other side of the coupling member, and an elastic supporting portion that has rigidity lower than the rigidity of the rigid supporting portion.

8 Claims, 9 Drawing Sheets

INSERTION COUPLING STRUCTURE, ELECTRICAL CONNECTION BOX, AND WIRE HARNESS

CROSS-REFERENCE TO RELATED APPLICATION(S)

The present application claims priority to and incorporates by reference the entire contents of Japanese Patent Application No. 2018-223177 filed in Japan on Nov. 29, 2018.

BACKGROUND OF THE INVENTION

1. Field of the Invention

The present invention relates to an insertion coupling structure, an electrical connection box, and a wire harness that are used for members mounted on vehicles such as automobiles.

2. Description of the Related Art

In running of automobiles, vibrations are easily generated, and thus devices that can prevent looseness due to vibrations are increasingly provided to portions where members mounted on the automobiles are fitted to each other. For example, in the structures described in Japanese Patent Application Laid-open No. 2008-286327, Japanese Patent Application Laid-open No. H08-222328, Japanese Patent Application Laid-open No. 2000-30812, and Japanese Patent No. 3501344, members made of resin materials are formed in shapes capable of exhibiting elasticity and the multiple members are coupled each other using the elasticity to prevent looseness.

When the coupling at the insertion portion is achieved using the elasticity of the members, holding force at the coupling depends on the elasticity of the members. Appropriate holding force may be hardly achieved depending on the elasticity. When the members exhibiting elasticity are formed in such shapes that the members can exhibit large elastic force for achieving the holding force after the coupling at the insertion portion, large force may be required as insertion force, which is force at the insertion portion in insertion.

SUMMARY OF THE INVENTION

In view of such circumstances, the invention is made and aims to provide an insertion coupling structure, an electrical connection box, and a wire harness that can achieve holding force while preventing insertion force from being excessively increased.

An insertion coupling structure according to one aspect of the present invention includes a base portion that is in contact with a surface on one side in a thickness direction of a coupling member; a clamping portion that faces a surface on another side of the coupling member; a rigid supporting portion that is provided to the clamping portion in a rib-like shape along an insertion direction that intersects the thickness direction of the coupling member and in which the coupling member is inserted, and is in contact with the surface on the other side of the coupling member; and an elastic supporting portion that has rigidity lower than rigidity of the rigid supporting portion, is provided to the clamping portion such that the elastic supporting portion is capable of being elastically deformed in the thickness direction of the coupling member and provided in a rib-like shape along the insertion direction, and is in contact with the surface on the other side of the coupling member.

According to another aspect of the present invention, in the insertion coupling structure, it is preferable that the rigid supporting portion is in contact with the coupling member that is in contact with the base portion.

According to still another aspect of the present invention, in the insertion coupling structure, it is preferable that the elastic supporting portion has a base that has a height lower than that of the rigid supporting portion in the thickness direction of the coupling member when the elastic supporting portion is not elastically deformed, and an arch-like portion that has a height higher than that of the rigid supporting portion in the thickness direction of the coupling member when the elastic supporting portion is not elastically deformed and protrudes toward the base side by being curved.

According to still another aspect of the present invention, in the insertion coupling structure, it is preferable that the elastic supporting portion has a slit formed at both sides of the arch-like portion.

An electrical connection box according to still another aspect of the present invention includes a housing that houses an electronic part; and an insertion coupling structure that is provided to the housing, wherein the insertion coupling structure includes: a base portion that is in contact with a surface on one side in a thickness direction of a coupling member; a clamping portion that faces a surface on another side of the coupling member; a rigid supporting portion that is provided to the clamping portion in a rib-like shape along an insertion direction that intersects the thickness direction of the coupling member and in which the coupling member is inserted, and is in contact with the surface on the other side of the coupling member; and an elastic supporting portion that has rigidity lower than rigidity of the rigid supporting portion, is provided to the clamping portion such that the elastic supporting portion is capable of being elastically deformed in the thickness direction of the coupling member and provided in a rib-like shape along the insertion direction, and is in contact with the surface on the other side of the coupling member.

A wire harness according to still another aspect of the present invention includes a routing member having conductivity; and an electrical connection box that is connected to the routing member, wherein the electrical connection box includes: a housing that houses an electronic part; and an insertion coupling structure that is provided to the housing, and the insertion coupling structure includes: a base portion that is in contact with a surface on one side in a thickness direction of a coupling member; a clamping portion that faces a surface on another side of the coupling member; a rigid supporting portion that is provided to the clamping portion in a rib-like shape along an insertion direction that intersects the thickness direction of the coupling member and in which the coupling member is inserted, and is in contact with the surface on the other side of the coupling member; and an elastic supporting portion that has rigidity lower than rigidity of the rigid supporting portion, is provided to the clamping portion such that the elastic supporting portion is capable of being elastically deformed in the thickness direction of the coupling member and provided in a rib-like shape along the insertion direction, and is in contact with the surface on the other side of the coupling member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

Figure 1:
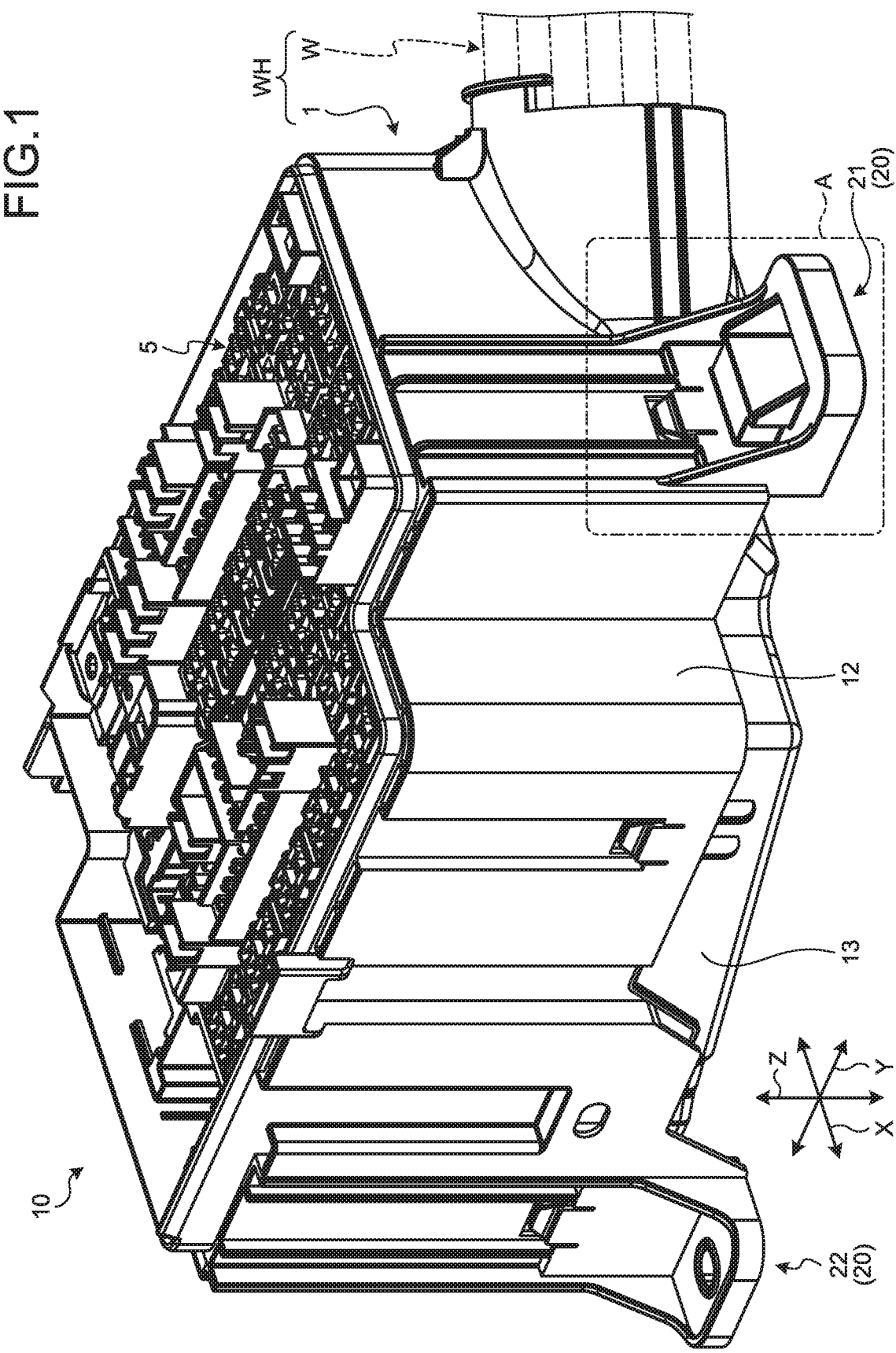
FIG. 1 is a perspective view of an electrical connection box according to an embodiment.

The following describes an embodiment of an insertion coupling structure, an electrical connection box, and a wire harness according to the invention in detail with reference to the accompanying drawings. The embodiment does not limit the invention. The constituent elements described in the following embodiment include those replaceable and easily envisaged by those skilled in the art and substantially identical thereto.

In the following description, three directions intersecting with one another are conveniently referred to as a "first direction X", a "second direction Y", and a "third direction Z". The first direction X, the second direction Y, and the third direction Z are perpendicular to one another. Typically, the first direction X corresponds to a direction in which a rigid supporting portion 35 and an elastic supporting portion 40 of an engaging attachment portion 21, which are described later, are arranged side by side. The second direction Y corresponds to an insertion direction of a coupling member 50, which is described later, and corresponds to an extending direction of the rigid supporting portion 35 and the elastic supporting portion 40 of the engaging attachment portion 21, which are described later. The third direction Z corresponds to a thickness direction of the coupling member 50, which is described later, and corresponds to a direction in which an upper cover, a frame 12, and a lower cover 13, which are described later, are layered. In the following description, in the third direction Z, a side where the upper cover is located with respect to the frame 12 is referred to as an upper direction or an upper side while a side where the lower cover 13 is located with respect to the frame 12 is referred to as a lower direction or a lower side in some cases.

Embodiment

FIG. 1 is a perspective view of an electrical connection box 1 according to an embodiment. The electrical connection box 1 in the embodiment is mounted on a vehicle such as an automobile and built in a wire harness WH. The wire harness WH is used for connecting various types of equipment mounted on a vehicle by connecting collective components, which are bundles of a plurality of routing members W used for power supply and signal communication, with connectors, for example. The wire harness WH includes the routing members W having conductivity and the electrical connection box 1 electrically connected to the routing members W. The routing members W are composed of metallic bars, electric wires, and electric wire bundles, for example. The metallic bar is composed of a conductive bar-like member and an insulating cover that covers the outside of the bar-like member. The electric wire is composed of a conductive body (core wire) formed of a plurality of conductive metallic element wires and an insulating cover that covers the outside of the conductive body. The electric wire bundle is a bundle of the electric wires. In the wire harness WH, the routing members W are put together by being bundled and the bundled routing members W are electrically connected to the electrical connection box 1 via a connector provided at the end of the bundled routing members W. The wire harness WH may further include a grommet, a protector, and a fixture, for example.

The electrical connection box 1 puts together electric components such as connectors, fuses, relays, capacitors, branches, and an electronic control unit and houses them inside thereof. The electrical connection box 1 is installed in an engine compartment or a cabin of a vehicle, for example. The electrical connection box 1 is connected between a power source such as a battery and various types of electronic equipment mounted inside the vehicle via the routing members W, for example. The electrical connection box 1 distributes electric power supplied from the power source to the various types of electronic equipment in the vehicle. The electrical connection box 1 is called a junction box, a fuse box, or a relay box, for example, in some cases. In the embodiment, those are collectively called the electrical connection box.

Specifically, the electrical connection box 1 includes a housing 10 and various electronic parts 5. The housing 10 is made of a resin material and can house the electronic parts 5. The housing 10 has the frame 12, the upper cover (not illustrated) attached to an upper portion of the frame 12, and the lower cover 13 attached to a lower portion of the frame 12. FIG. 1 illustrates a state where the upper cover is removed.

The housing 10 is provided with attachment portions 20 that attach the electrical connection box 1 to a body of the vehicle. A plurality of the attachment portions 20 are provided at positions near the lower end of the frame 12 of the electrical connection box 1. The attachment portions 20 have a plurality of types. The attachment portions 20 include the engaging attachment portion 21 that attaches the electrical connection box 1 to the body by engagement with the body and a fastening attachment portion 22 that attaches the electrical connection box 1 to the body using a fixing member such as a bolt (not illustrated).

Figure 2:
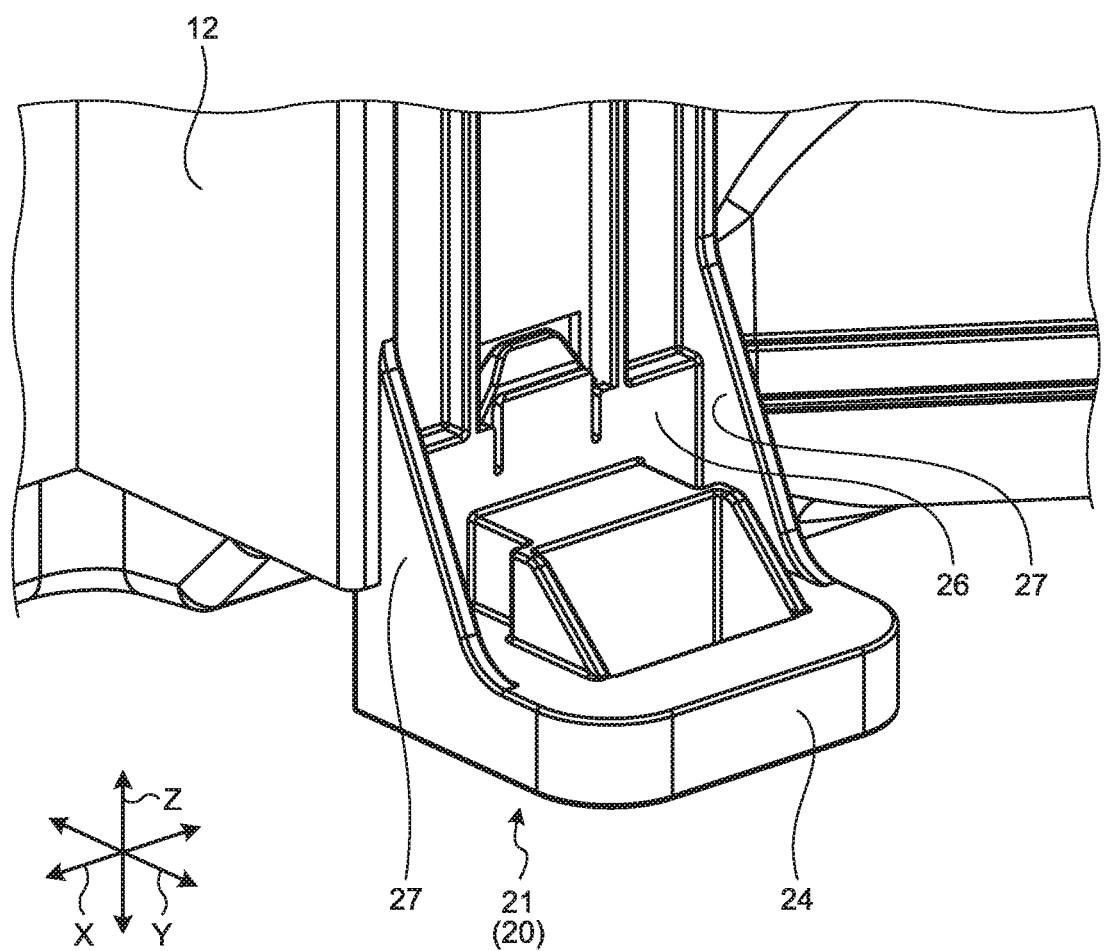
FIG. 2 is a detailed view of part A in FIG. 1.

FIG. 2 is a detailed view of part A in FIG. 1. The engaging attachment portion 21, which is one type of the attachment portions 20, has a base portion 24, a supporting portion 26, and reinforcing walls 27. The supporting portion 26 protrudes from the frame 12 toward the lower side in the third direction Z. The base portion 24 is formed in such a manner that the base portion 24 protrudes from the lower end position of the supporting portion 26 to the second direction Y. The reinforcing wall 27 is formed as a reinforcing member that is connected to both of the base portion 24 and the supporting portion 26 on the upper side of the base portion 24 in the third direction Z. The reinforcing walls 27 are disposed both ends of the base portion 24 in the first direction X.

Figure 3:
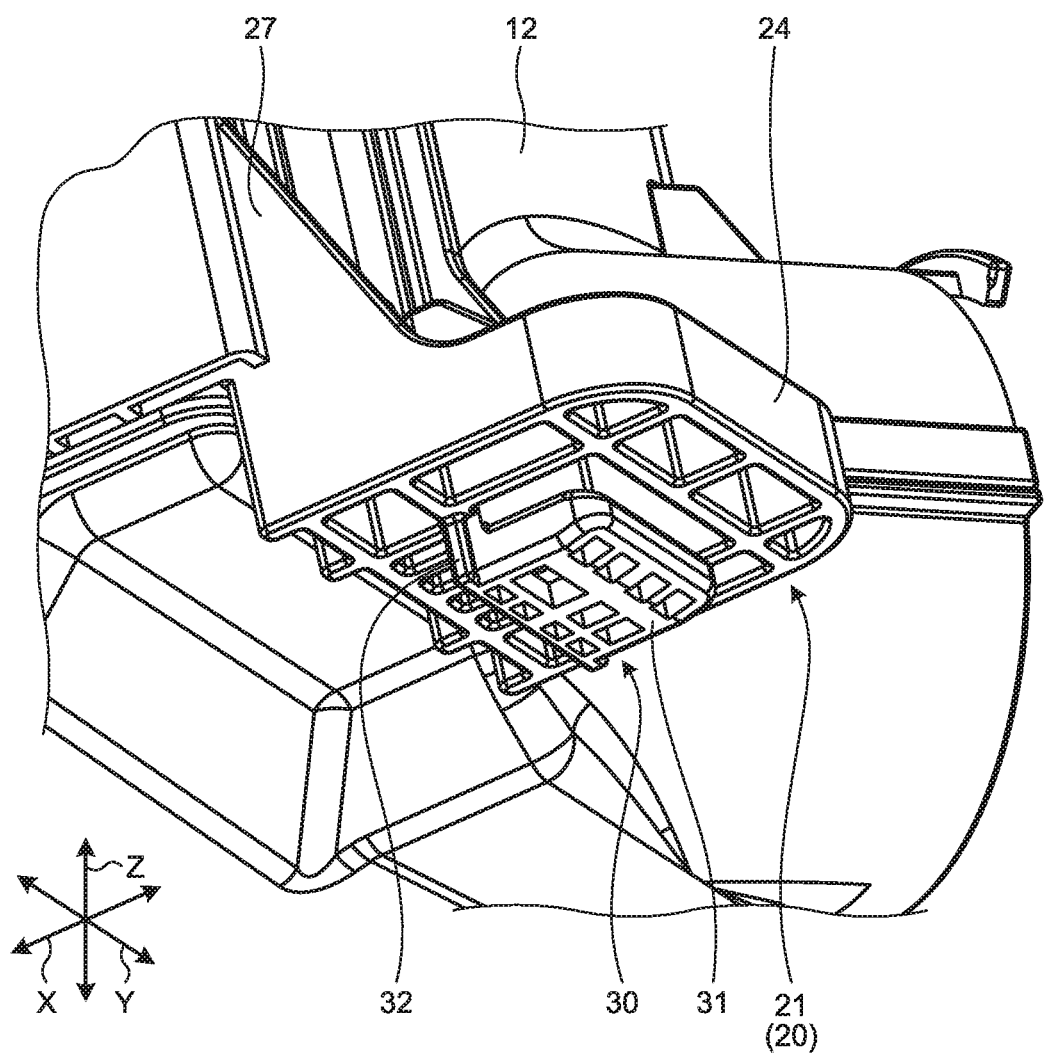
FIG. 3 is a perspective view of an engaging attachment portion illustrated in FIG. 2 when viewed from a lower side.

FIG. 3 is a perspective view of the engaging attachment portion 21 illustrated in FIG. 2 when viewed from the lower side. The engaging attachment portion 21 further has a clamping portion 30. The clamping portion 30 is formed on the lower surface side of the base portion 24. The clamping portion 30 has a clamping portion main body 31 and a clamping portion connecting portion 32. The clamping portion connecting portion 32 protrudes from the lower surface of the base portion 24 toward the lower side in the third direction Z. The clamping portion main body 31 is formed in such a manner that the clamping portion main body 31 protrudes from the lower end position of the clamping portion connecting portion 32 to the second direction Y by being directed to the same direction to which the base portion 24 protrudes from the supporting portion 26 in the second direction Y.

Figure 4:
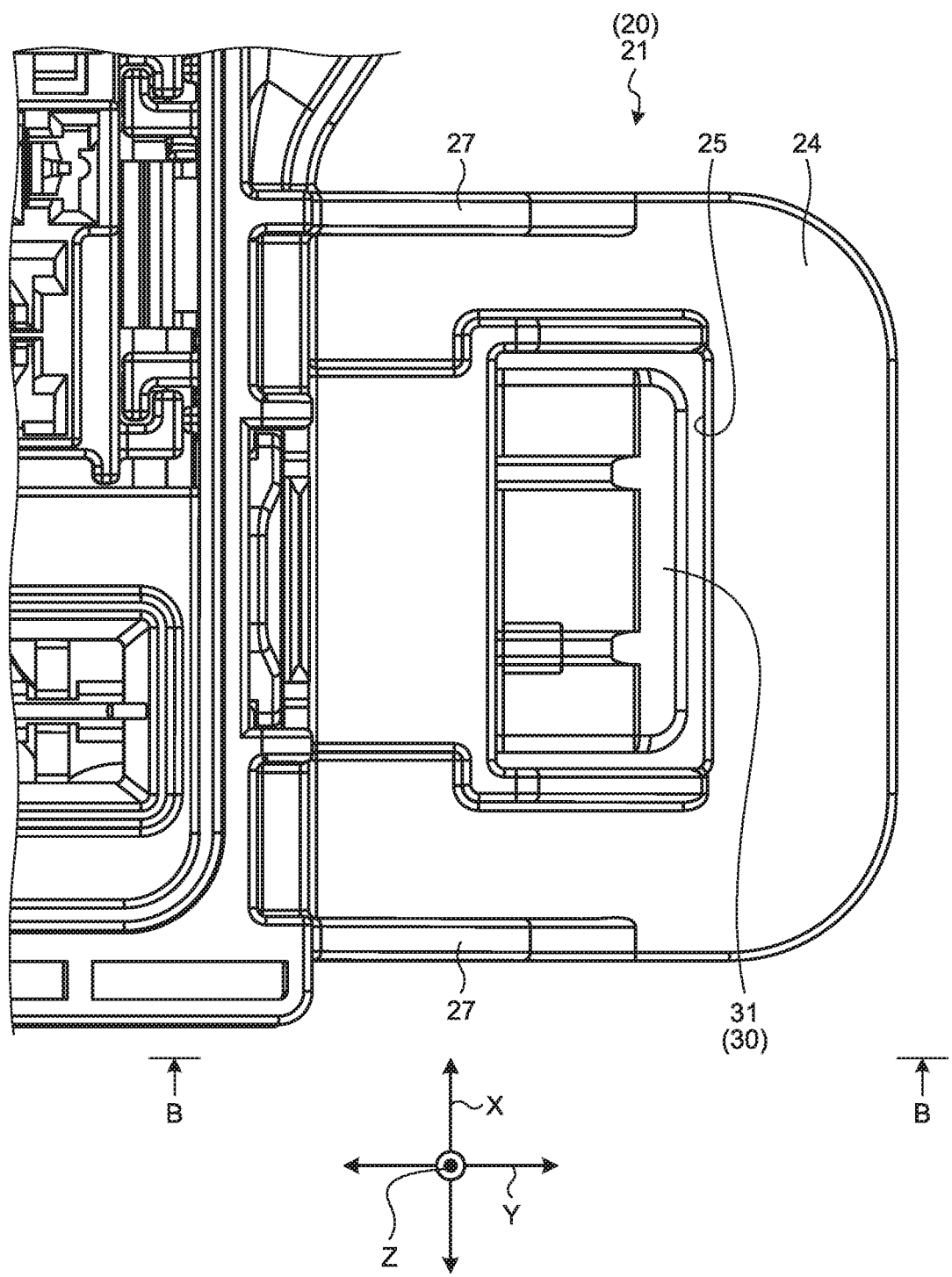
FIG. 4 is a plan view of the engaging attachment portion illustrated in FIG. 2.
Figure 5:
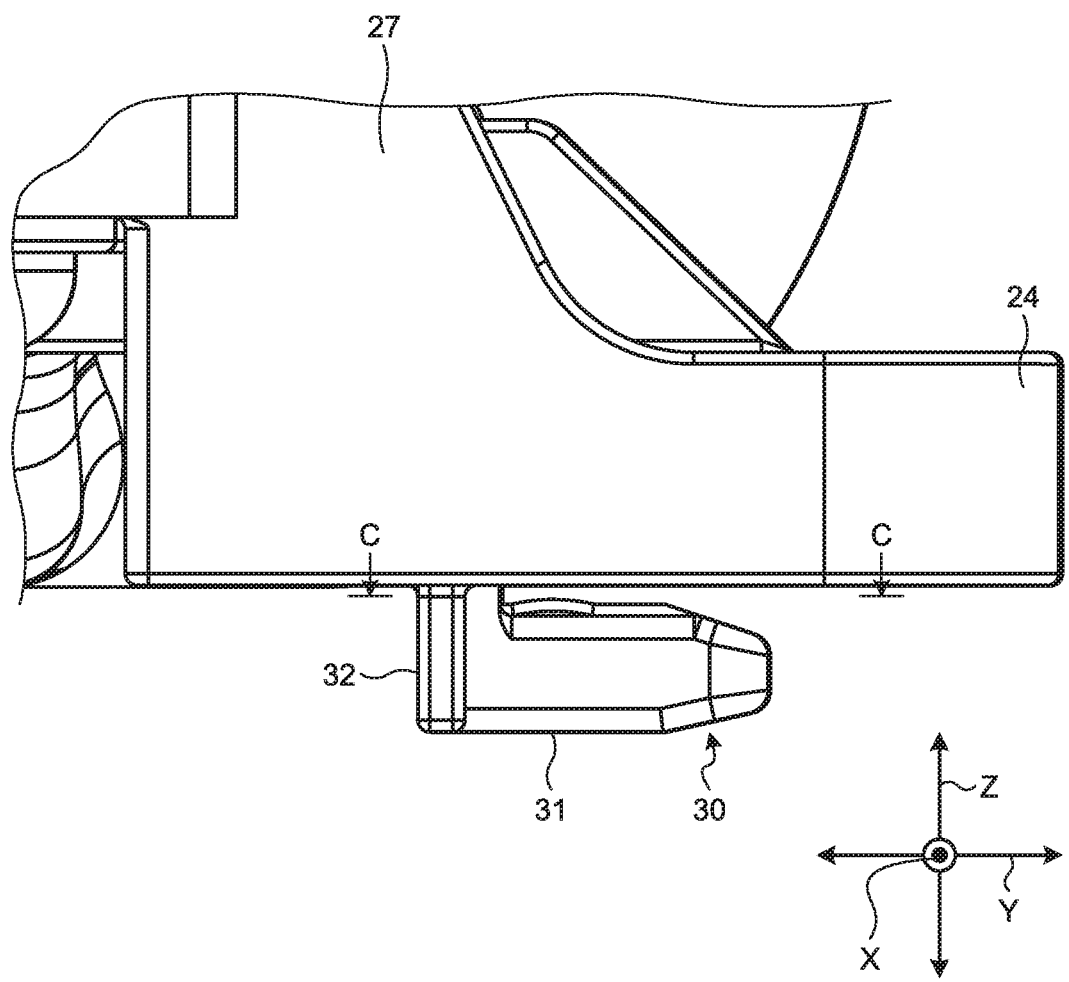
FIG. 5 is a B-B arrow view of FIG. 4.

FIG. 4 is a plan view of the engaging attachment portion 21 illustrated in FIG. 2. FIG. 5 is a B-B arrow view of FIG. 4. The base portion 24 is formed such that the shape in a plan view, i.e., the shape when viewed in the third direction Z, of the base portion 24 is substantially oblong. The base portion 24 has an opening 25 that has a substantially oblong shape and passes through the base portion 24 in the third direction Z. The clamping portion connecting portion 32 of the clamping portion 30 protrudes toward the lower direction of the base portion 24 from a vicinity of a side of the opening 25, the side being on a side where the supporting portion 26 is located. The clamping portion main body 31 is formed in a substantially oblong shape having a size nearly the same as that of the opening 25 of the base portion 24 in a plan view. The clamping portion main body 31 protrudes from the lower end position of the supporting portion 26 in the second direction Y substantially in parallel with the base portion 24.

Figure 6:
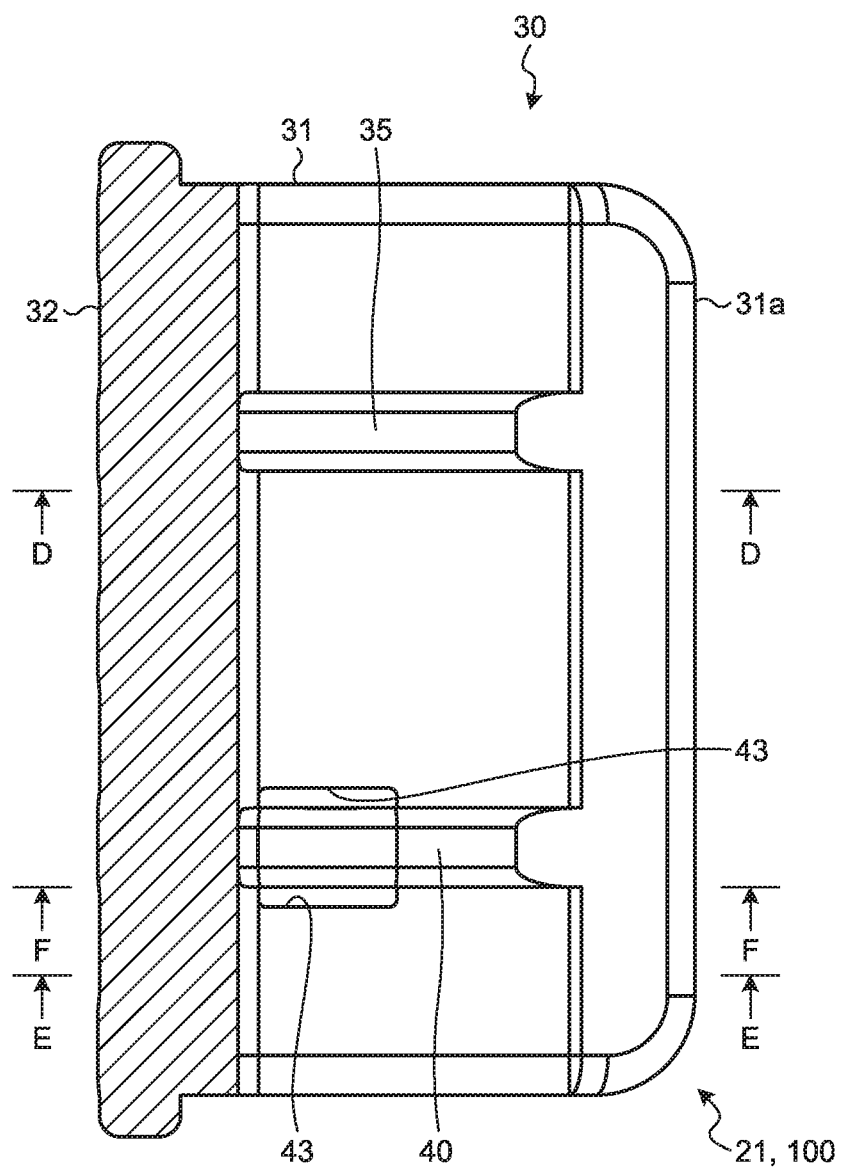
FIG. 6 is a cross-sectional view taken along C-C in FIG. 5.

FIG. 6 is a cross-sectional view taken along C-C in FIG. 5. The clamping portion 30 has the rigid supporting portion 35 and the elastic supporting portion 40 formed on the clamping portion main body 31. The engaging attachment portion 21, thus, has an insertion coupling structure 100 according to the embodiment. The insertion coupling structure 100 is structured by including the base portion 24, the clamping portion 30, the rigid supporting portion 35, and the elastic supporting portion 40. The rigid supporting portion 35 and the elastic supporting portion 40 are each formed to have a substantially constant width in the first direction X and extend in the second direction Y substantially in parallel. The rigid supporting portion 35 and the elastic supporting portion 40 are arranged apart from each other with a certain distance therebetween in the first direction X. One end in the second direction Y of each of the rigid supporting portion 35 and the elastic supporting portion 40 that extend in the second direction Y is connected to the clamping portion connecting portion 32. The other end in the second direction Y of each of the rigid supporting portion 35 and the elastic supporting portion 40 is located closer to the clamping portion connecting portion 32 than the end opposite the end on the side of the clamping portion main body 31 where the clamping portion connecting portion 32 is located in the second direction Y.

Figure 7:
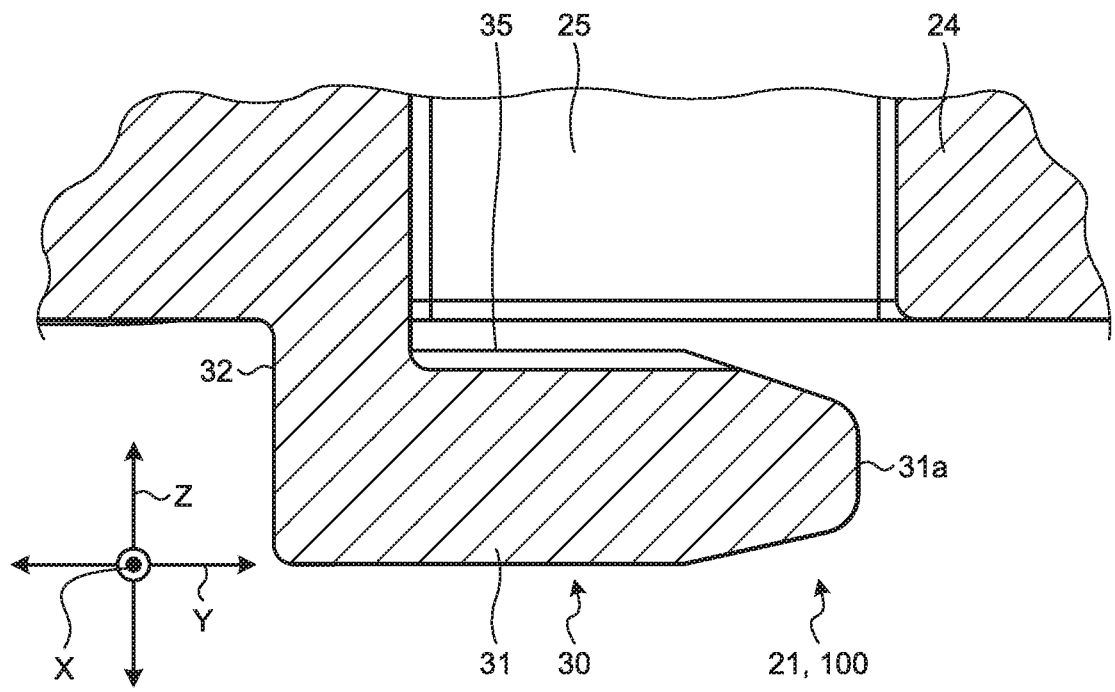
FIG. 7 is a cross-sectional view taken along D-D in FIG. 6.

FIG. 7 is a cross-sectional view taken along D-D in FIG. 6. The surface located on the base portion 24 side of the clamping portion main body 31 is formed substantially in parallel with the surface located on the clamping portion main body 31 side of the base portion 24. Near a tip 31a, which is the end opposite the end where the clamping portion connecting portion 32 is located in the second direction Y, of the clamping portion main body 31, the thickness of the clamping portion main body 31 in the third direction Z is reduced from the side where the clamping portion connecting portion 32 is located toward the tip 31a. The clamping portion main body 31 is, thus, formed at a position near the tip 31a such that the distance between the surface located on the base portion 24 side and the base portion 24 is increased from the side where the clamping portion connecting portion 32 is located toward the tip 31a.

The rigid supporting portion 35 provided to the clamping portion main body 31 is formed on the surface located on the base portion 24 side of the clamping portion main body 31. The rigid supporting portion 35 protrudes from the clamping portion main body 31 toward the side where the base portion 24 is located in the third direction Z. The rigid supporting portion 35 is formed in a rib-like shape protruding from the clamping portion main body 31 and extending in the second direction Y. The height of the rigid supporting portion 35 in the third direction Z from the clamping portion main body 31 is substantially constant. At the position near the tip 31a of the clamping portion main body 31, the height from the clamping portion main body 31 is reduced from the side where the clamping portion connecting portion 32 in the second direction Y is located toward the tip 31a.

In the rigid supporting portion 35 thus formed, the distance between the portion formed to have a substantially constant height and the base portion 24 in the third direction Z is substantially the same as that of the coupling member 50 (refer to FIG. 10), which is described later. The distance from the rigid supporting portion 35 to the base portion 24 in the thickness direction of the coupling member 50 is substantially the same size as the thickness of the coupling member 50.

Figure 8:
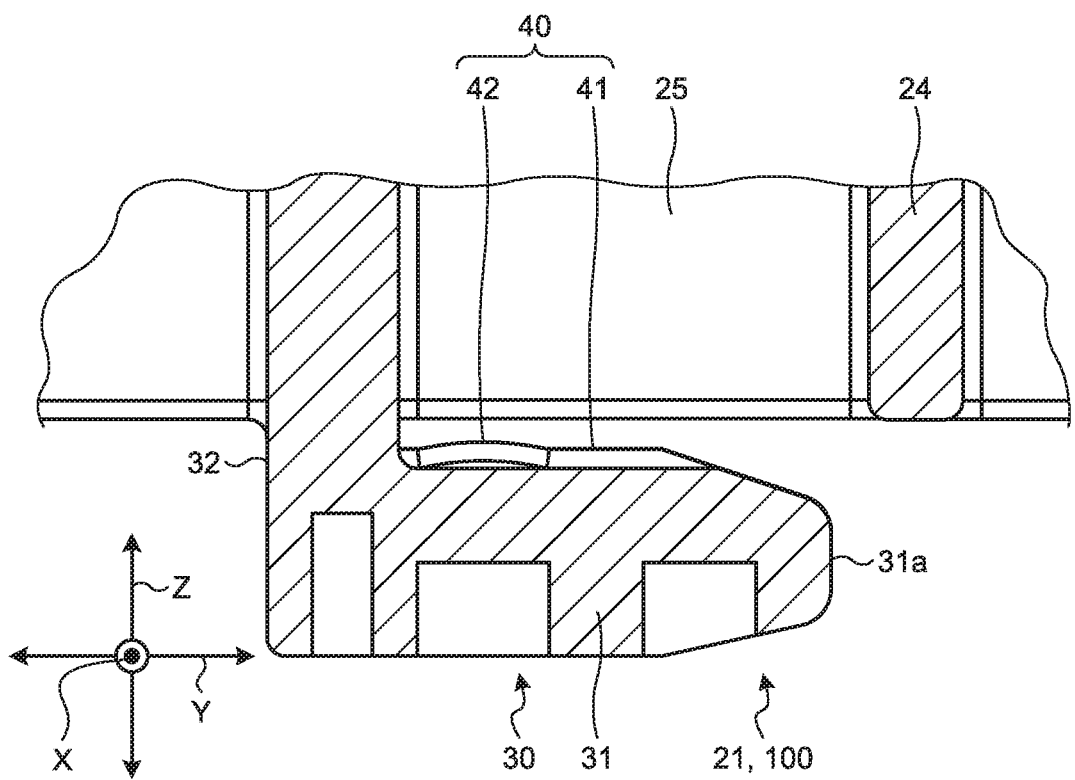
FIG. 8 is a cross-sectional view taken along E-E in FIG. 6.
Figure 9:
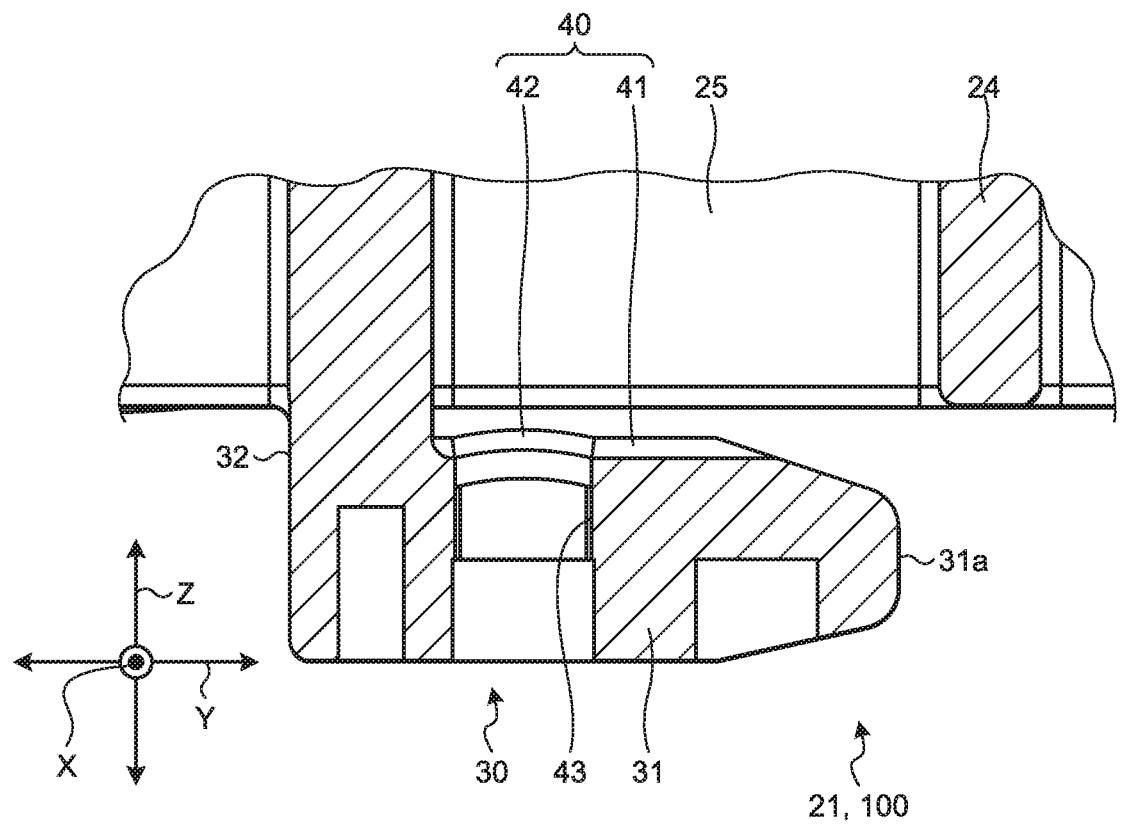
FIG. 9 is a cross-sectional view taken along F-F in FIG. 6.

FIG. 8 is a cross-sectional view taken along E-E in FIG. 6. FIG. 9 is a cross-sectional view taken along F-F in FIG. 6. The elastic supporting portion 40 is also formed on the surface located on the base portion 24 side of the clamping portion main body 31 likewise the rigid supporting portion 35. The elastic supporting portion 40 protrudes from the clamping portion main body 31 toward the side where the base portion 24 is located in the third direction Z. The elastic supporting portion 40 is also formed in a rib-like shape protruding from the clamping portion main body 31 and extending in the second direction Y.

The elastic supporting portion 40 has a base 41 and an arch-like portion 42. The base 41 is provided both sides of the arch-like portion 42 in the second direction Y. The height of the base 41 from the clamping portion main body 31 in the third direction Z is substantially constant and lower than the height of the rigid supporting portion 35. At the position near the tip 31a of the clamping portion main body 31, the height of the base 41 from the clamping portion main body 31 is reduced from the position where the clamping portion connecting portion 32 is located in the second direction Y toward the tip 31a.

The arch-like portion 42 is formed in an arch-like shape when viewed in the first direction X. The arch-like portion 42 is formed in a curved shape protruding toward the base portion 24 side when viewed in the first direction X. The arch-like portion 42 formed in an arch-like shape has the highest height in the third direction Z at a position near its midpoint in the second direction Y. The height of the arch-like portion 42 is reduced from the midpoint toward both ends thereof in the second direction Y. The height of the arch-like portion 42 at both ends in the second direction Y is the same as the height of the base 41. The height of the arch-like portion 42 at the position where the height is the highest in the third direction Z is higher than the height of the rigid supporting portion 35.

A slit 43 is formed at both sides of the arch-like portion 42 of the elastic supporting portion 40 in the first direction X (refer to FIGS. 6 and 9). The slit 43 is formed to the clamping portion main body 31 in a hole-like shape that opens in the third direction Z such that the slit 43 is formed at the same position as the arch-like portion 42 in the second direction Y and its length in the second direction Y is equal to the length of the arch-like portion 42. The slit 43 is formed at both sides of the arch-like portion 42 in the first direction X, resulting in the arch-like portion 42 being connected to the clamping portion main body 31 only at both ends of the arch-like portion 42 in the second direction Y.

The arch-like portion 42 is connected to the clamping portion main body 31 only at both ends of the arch-like portion 42 in the second direction Y and formed in a curved shape protruding toward the base portion 24 side. The arch-like portion 42, thus, can be elastically deformed in the third direction Z and has elasticity in the third direction Z. The elastic supporting portion 40 having the arch-like portion 42, thus, has rigidity lower than that of the rigid supporting portion 35. The height of the arch-like portion 42 at the position where the height is the highest is higher than the rigid supporting portion 35. The distance between the arch-like portion 42 and the base portion 24 in the thickness direction of the coupling member 50 (refer to FIG. 11) when the arch-like portion 42 is not elastically deformed is, thus, smaller than the distance between the base portion 24 and the rigid supporting portion 35 in the thickness direction of the coupling member 50.

The insertion coupling structure 100, the electrical connection box 1, and the wire harness WH according to the embodiment have the structures described above. The following describes their operations. When the electrical connection box 1 is mounted on a vehicle, the electrical connection box 1 is fixed to the vehicle by attaching the attachment portions 20 to the body of the vehicle. The attachment portions 20 include the engaging attachment portion 21 and the fastening attachment portion 22. The engaging attachment portion 21 is engaged with the body, thereby fixing the electrical connection box 1 to the body.

Figure 10:
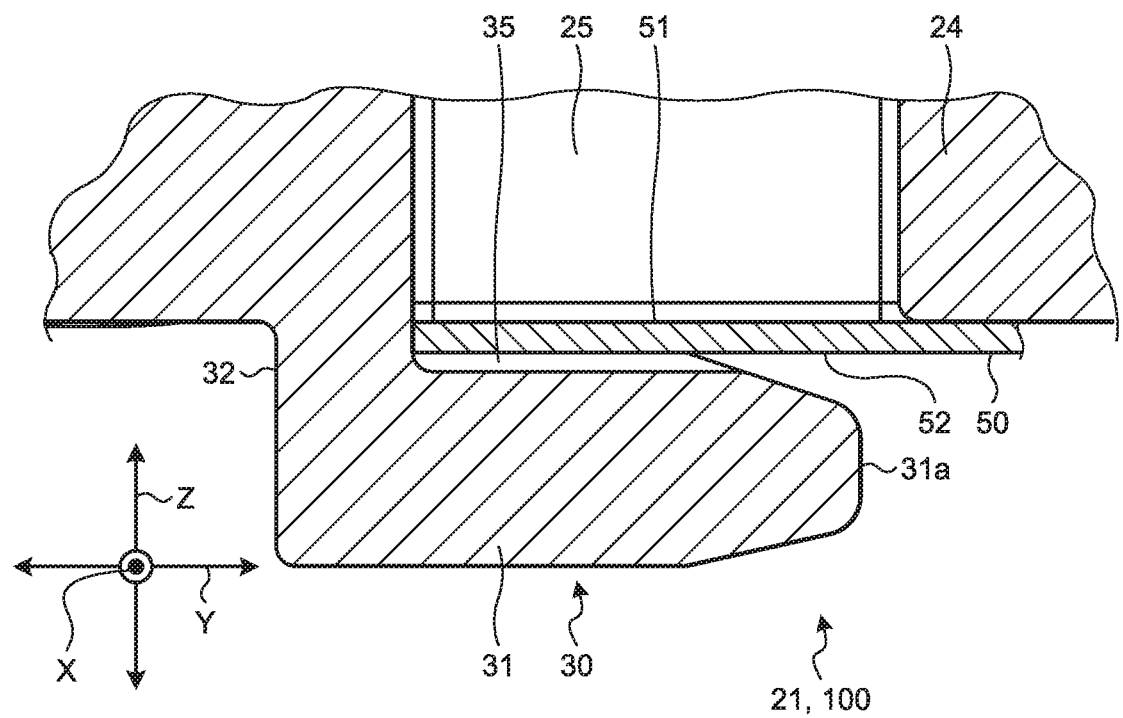
FIG. 10 is an explanatory view of coupling of the engaging attachment portion with a coupling member at a position where a rigid supporting portion is disposed.

FIG. 10 is an explanatory view of coupling of the engaging attachment portion 21 with the coupling member 50 at the position where the rigid supporting portion 35 is disposed. When the engaging attachment portion 21 is engaged with the body, the coupling member 50, which is a steel plate of the body and engaged with the engaging attachment portion 21, is inserted between the base portion 24 of the engaging attachment portion 21 and the clamping portion main body 31 of the clamping portion 30. When the coupling member 50 is inserted between the base portion 24 and the clamping portion main body 31, the coupling member 50 is put between the base portion 24 and the clamping portion main body 31 from the tip 31a side of the clamping portion main body 31, and relatively moved in the second direction Y toward the side where the clamping portion connecting portion 32 is located. The second direction Y is, thus, the insertion direction of the coupling member 50 when the coupling member 50 is inserted between the base portion 24 and the clamping portion main body 31. The insertion direction intersects the thickness direction of the coupling member 50. The rigid supporting portion 35 and the elastic supporting portion 40, which are formed on the clamping portion 30, are provided in a rib-like shape along the insertion direction in which the coupling member 50 is inserted.

As a result of the insertion of the coupling member 50 between the base portion 24 and the clamping portion main body 31, a surface 51, which is the surface on one side in the thickness direction of the coupling member 50, of the coupling member 50 is in contact with the base portion 24. In the following description, the surface 51 on the side where the coupling member 50 is in contact with the base portion 24, of the coupling member 50 is referred to as an upper surface 51 while a surface 52 on the other side in the thickness direction of the coupling member 50 is referred to as a lower surface 52. When the coupling member 50 is inserted between the base portion 24 and the clamping portion main body 31, the base portion 24 is in contact with the upper surface 51 of the coupling member 50.

When the coupling member 50 is inserted between the base portion 24 and the clamping portion main body 31, the clamping portion main body 31 faces the lower surface 52 of the coupling member 50. The distance between the rigid supporting portion 35 formed on the clamping portion main body 31 and the base portion 24 in the thickness direction of the coupling member 50 is substantially the same size as the thickness of the coupling member 50. The rigid supporting portion 35 is, thus, in contact with the lower surface of the coupling member 50 when the coupling member 50 is inserted between the base portion 24 and the clamping portion main body 31. The rigid supporting portion 35 is in contact with the coupling member 50 that is in contact with the base portion 24 on the side opposite the surface of the coupling member 50 with which the base portion 24 is in contact.

When the coupling member 50 is inserted between the base portion 24 and the clamping portion main body 31, the base portion 24 is in contact with the upper surface 51 of the coupling member 50 while the rigid supporting portion 35 is in contact with the lower surface 52 of the coupling member 50. As a result, the base portion 24 and the rigid supporting portion 35 of the engaging attachment portion 21 clamp and hold the coupling member 50 at the position where the rigid supporting portion 35 is disposed.

Figure 11:
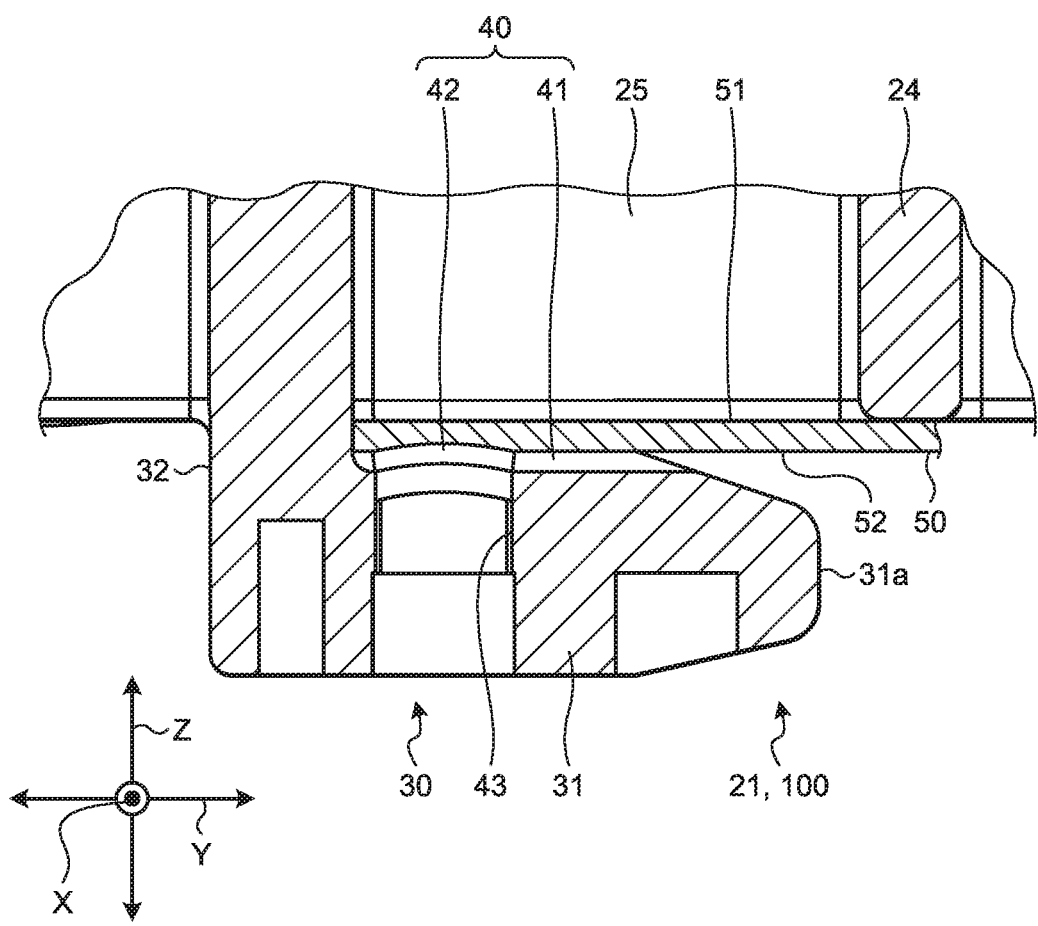
FIG. 11 is an explanatory view of the coupling of the engaging attachment portion with the coupling member at a position where an elastic supporting portion is disposed.

FIG. 11 is an explanatory view of the coupling of the engaging attachment portion 21 with the coupling member 50 at the position where the elastic supporting portion 40 is disposed. The height of the base 41 of the elastic supporting portion 40 from the clamping portion main body 31 in the third direction Z is lower than the height of the rigid supporting portion 35. At the position where the base 41 is disposed, resistance against force in the insertion direction hardly occurs when the coupling member 50 is inserted between the base portion 24 and the clamping portion main body 31. The height of the base 41 of the elastic supporting portion 40 in the thickness direction of the coupling member 50 is lower than the height of the rigid supporting portion 35 when the elastic supporting portion 40 is not elastically deformed. The distance between the base 41 and the base portion 24 is, thus, larger than the distance between the base portion 24 and the rigid supporting portion 35. As a result, when the coupling member 50 is inserted between the base portion 24 and the clamping portion main body 31, friction force between the base portion 24 and the coupling member 50 and between the base 41 and the coupling member 50 is hardly increased at the position where the base 41 of the elastic supporting portion 40 is disposed. Consequently, resistance against force in the insertion direction is hardly increased.

When the coupling member 50 is inserted between the base portion 24 and the clamping portion main body 31 from the tip 31a side of the clamping portion main body 31, and then the coupling member 50 is inserted between the arch-like portion 42 of the elastic supporting portion 40 and the base portion 24, the arch-like portion 42 is elastically deformed. The height of the arch-like portion 42 in the thickness direction of the coupling member 50 is higher than the rigid supporting portion 35 when the arch-like portion 42 is not elastically deformed. When the arch-like portion 42 is not elastically deformed, the distance between the arch-like portion 42 and the base portion 24 is smaller than the distance between the base portion 24 and the rigid supporting portion 35. The distance between the arch-like portion 42 and the base portion 24 is, thus, smaller than the thickness of the coupling member 50 when the arch-like portion 42 is not elastically deformed.

When the coupling member 50 is inserted between the arch-like portion 42 and the base portion 24, the arch-like portion 42 is elastically deformed in the thickness direction of the coupling member 50 because the arch-like portion 42 of the elastic supporting portion 40 is formed such that the arch-like portion 42 can be elastically deformed in the thickness direction of the coupling member 50. When the coupling member 50 is inserted between the arch-like portion 42 and the base portion 24, the arch-like portion 42 of the elastic supporting portion 40 is pressed by the coupling member 50 and elastically deformed, thereby being in contact with the lower surface 52 of the coupling member 50. As a result, the arch-like portion 42 clamps and holds the coupling member 50 between the arch-like portion 42 and the base portion 24 while applying pressing force to the coupling member 50 in the thickness direction.

In the insertion coupling structure 100 according to the embodiment, the rigid supporting portion 35 having a rib-like shape and the elastic supporting portion 40 having a rib-like shape are disposed on the clamping portion 30. The coupling member 50 is clamped between the rigid supporting portion 35 and the base portion 24 and between the elastic supporting portion 40 and the base portion 24. As a result, the insertion coupling structure 100 holds the coupling member 50. The rigid supporting portion 35 can hold the coupling member 50 while applying appropriate pressing force to the coupling member 50 together with the base portion 24 because the rigid supporting portion 35 can be in contact with the lower surface 52 of the coupling member 50, which is the surface opposite the upper surface 51 in contact with the base portion 24, without being elastically deformed. The elastic supporting portion 40 can prevent the insertion force necessary for the insertion from being increased by being elastically deformed when the coupling member 50 is inserted between the elastic supporting portion 40 and the base portion 24 because the elastic supporting portion 40 is formed such that the elastic supporting portion 40 can be elastically deformed in the thickness direction of the coupling member 50.

In addition, the elastic supporting portion 40 can be elastically deformed by following an error in the thickness of the coupling member 50, thereby making it possible to be in contact with the coupling member 50 because the elastic supporting portion 40 is formed such that the elastic supporting portion 40 can be elastically deformed in the thickness direction of the coupling member 50. For example, when the thickness of the coupling member 50 is formed thinner due to a dimensional error in the thickness of the coupling member 50, the elastic supporting portion 40 is elastically deformed by following the error in the thickness of the coupling member 50, thereby being in contact with the coupling member 50. The elastic supporting portion 40, thus, can apply appropriate pressing force to the coupling member 50 to hold the coupling member 50 without occurrence of looseness. As a result, the holding force can be achieved while the insertion force is prevented from being excessively increased.

The rigid supporting portion 35 is in contact with the coupling member 50 that is in contact with the base portion 24. The rigid supporting portion 35, thus, can hold the coupling member 50 while more reliably applying appropriate pressing force to the coupling member 50. As a result, the holding force can be achieved while the insertion force is prevented from being excessively increased.

The elastic supporting portion 40 has the base 41 having the height lower than the rigid supporting portion 35 in the thickness direction of the coupling member 50. The elastic supporting portion 40, thus, can reduce the friction force between the base 41 and the coupling member 50 located between the base portion 24 and the base 41. As a result, insertion force in insertion of the coupling member 50 can be more reliably prevented from being excessively increased. The elastic supporting portion 40 has the arch-like portion 42 that can be elastically deformed due to its curved shape, and has the height higher than the rigid supporting portion 35 in the thickness direction of the coupling member 50 when the arch-like portion 42 is not elastically deformed. The arch-like portion 42, thus, can be elastically deformed and in contact with the coupling member 50 regardless of an error in the thickness of the coupling member 50. As a result, appropriate pressing force can be applied to the coupling member 50 regardless of the error in the thickness of the coupling member 50. Consequently, the holding force can be achieved while the insertion force is more reliably prevented from being excessively increased.

The slit 43 is formed at both sides of the arch-like portion 42 of the elastic supporting portion 40, thereby allowing the arch-like portion 42 to be more reliably elastically deformed. This makes it possible for the arch-like portion 42 to be elastically deformed by following the thickness of the coupling member 50 and in contact with the coupling member 50 regardless of an error in the thickness of the coupling member 50, thereby making it possible to apply appropriate pressing force to the coupling member 50. As a result, the holding force can be achieved while the insertion force is prevented from being excessively increased.

The electrical connection box 1 according to the embodiment uses the insertion coupling structure 100 according to the embodiment for the housing 10 housing the electronic parts 5. When the electrical connection box 1 is attached to the coupling member 50, the coupling member 50, thus, can be held while appropriate pressing force is applied to the coupling member 50 regardless of a dimensional error in the coupling member 50, and the insertion force in insertion of the coupling member 50 is prevented from being excessively increased. As a result, the holding force can be achieved while the insertion force is prevented from being excessively increased.

The wire harness WH according to the embodiment includes the conductive routing members W and the electrical connection box 1. The electrical connection box 1 uses the insertion coupling structure 100 according to the embodiment for the housing 10. This makes it possible to hold the coupling member 50 by applying appropriate pressing force to the coupling member 50 while the insertion force in insertion of the coupling member 50 is prevented from being excessively increase when the electrical connection box 1 is attached to the coupling member 50. As a result, the holding force can be achieved while the insertion force is prevented from being excessively increased.

Modifications

In the embodiment described above, one clamping portion 30 is provided with one rigid supporting portion 35 and one elastic supporting portion 40. The numbers of rigid supporting portions 35 and elastic supporting portions 40 are not limited to those described above. Any number may be employed. At least one rigid supporting portion 35 and at least one elastic supporting portion 40 may be provided. A plurality of rigid supporting portions 35 and a plurality of elastic supporting portions 40 may be provided. The balance between the insertion force and the holding force can be appropriately adjusted by adjusting the numbers of rigid supporting portions 35 and elastic supporting portions 40.

In the embodiment described above, the insertion coupling structure 100 is used for the fixation portion where the electrical connection box 1 is fixed to the body of the vehicle. The insertion coupling structure 100 may be used for portions other than the fixation portion. The insertion coupling structure 100 may be used for a fixation portion where the protector protecting the routing members W is fixed to the body of the vehicle and a fixation portion where the protectors are fixed to one another, for example. Members other than the steel plate of the body of the vehicle may be used as the coupling members 50.

The insertion coupling structure, the electrical connection box, and the wire harness according to the embodiment include the clamping portion to which the rigid supporting portion and the elastic supporting portion are provided, and can hold the coupling member by clamping the coupling member between the rigid supporting portion and the base portion and between the elastic supporting portion and the base portion. The rigid supporting portion can hold the coupling member while applying appropriate pressing force to the coupling member together with the base portion because the rigid supporting portion can be in contact with the surface on the other side of the coupling member without being elastically deformed. The elastic supporting portion is elastically deformed when the coupling member is inserted between the elastic supporting portion and the base portion, thereby making it possible to prevent the insertion force necessary for insertion of the coupling member from being excessively increased because the elastic supporting portion is formed such that the elastic supporting portion can be elastically deformed in the thickness direction of the coupling member. As a result, the insertion coupling structure, the electrical connection box, and the wire harness according to the embodiment have an advantageous effect of capable of achieving the holding force while preventing the insertion force from being excessively increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An insertion coupling structure having an electrical connection box, comprising:
   a base portion that is in contact with a surface on one side in a thickness direction of a coupling member;
   a clamping portion extended from the base portion have having a clamp body that faces a surface on another side of the coupling member;
   a rigid supporting portion that is provided to the clamping portion in a rib-like shape along an insertion direction that intersects the thickness direction of the coupling member and in contact with the base portion and in which the coupling member is inserted, and is in contact with the surface on the other side of the coupling member; and
   an elastic supporting portion that has rigidity lower than rigidity of the rigid supporting portion, is provided to the clamping portion such that the elastic supporting portion is positioned away from the rigid supporting portion and is capable of being elastically deformed in the thickness direction of the coupling member and provided in a rib-like shape along the insertion direction, and is in contact with the surface on the other side of the coupling member.

2. The insertion coupling structure according to claim 1, wherein
   the rigid supporting portion is in contact with the coupling member.

3. The insertion coupling structure according to claim 1, wherein
   the elastic supporting portion has a base that has a height lower than that of the rigid supporting portion in the thickness direction of the coupling member when the elastic supporting portion is not elastically deformed, and an arch-like portion that has a height higher than that of the rigid supporting portion in the thickness direction of the coupling member when the elastic supporting portion is not elastically deformed and protrudes toward the base side by being curved.

4. The insertion coupling structure according to claim 2, wherein
   the elastic supporting portion has a base that has a height lower than that of the rigid supporting portion in the thickness direction of the coupling member when the elastic supporting portion is not elastically deformed, and an arch-like portion that has a height higher than that of the rigid supporting portion in the thickness direction of the coupling member when the elastic supporting portion is not elastically deformed and protrudes toward the base side by being curved.

5. The insertion coupling structure according to claim 3, wherein
   the elastic supporting portion has a slit formed at both sides of the arch-like portion.

6. The insertion coupling structure according to claim 4, wherein
   the elastic supporting portion has a slit formed at both sides of the arch-like portion.

7. An electrical connection box, comprising:
   a housing that houses an electronic part; and
   an insertion coupling structure that is provided to the housing, wherein
   the insertion coupling structure includes:
   a base portion that is in contact with a surface on one side in a thickness direction of a coupling member;
   a clamping portion extended from the base portion have having a clamp body that faces a surface on another side of the coupling member;
   a rigid supporting portion that is provided to the clamping portion in a rib-like shape along an insertion direction that intersects the thickness direction of the coupling member and in contact with the base portion and in which the coupling member is inserted, and is in contact with the surface on the other side of the coupling member; and an elastic supporting portion that has rigidity lower than rigidity of the rigid supporting portion, is provided to the clamping portion such that the elastic supporting portion is positioned away from the rigid supporting portion and is capable of being elastically deformed in the thickness direction of the coupling member and provided in a rib-like shape along the insertion direction, and is in contact with the surface on the other side of the coupling member.

8. A wire harness, comprising:

a routing member having conductivity; and an electrical connection box that is connected to the routing member, wherein the electrical connection box includes:

a housing that houses an electronic part; and an insertion coupling structure that is provided to the housing, and the insertion coupling structure includes:

a base portion that is in contact with a surface on one side in a thickness direction of a coupling member;

a clamping portion extended from the base portion and having a clamp body that faces a surface on another side of the coupling member;

a rigid supporting portion that is provided to the clamping portion in a rib-like shape along an insertion direction that intersects the thickness direction of the coupling member and in contact with the base portion and in which the coupling member is inserted, and is in contact with the surface on the other side of the coupling member; and an elastic supporting portion that has rigidity lower than rigidity of the rigid supporting portion, is provided to the clamping portion such that the elastic supporting portion is positioned away from the rigid supporting portion and capable of being elastically deformed in the thickness direction of the coupling member and provided in a rib-like shape along the insertion direction, and is in contact with the surface on the other side of the coupling member.

\* \* \* \* \*